United States Patent
Horiuchi et al.

(10) Patent No.: US 11,375,494 B2
(45) Date of Patent: Jun. 28, 2022

(54) TERMINAL AND RECEPTION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/256,697

(22) PCT Filed: Jul. 16, 2019

(86) PCT No.: PCT/JP2019/027938
§ 371 (c)(1),
(2) Date: Dec. 29, 2020

(87) PCT Pub. No.: WO2020/066232
PCT Pub. Date: Apr. 2, 2020

(65) Prior Publication Data
US 2021/0266880 A1    Aug. 26, 2021

(30) Foreign Application Priority Data
Sep. 27, 2018  (JP) .............................. JP2018-181867

(51) Int. Cl.
*H04W 72/04*       (2009.01)
*H04L 1/00*        (2006.01)
*H04L 1/20*        (2006.01)

(52) U.S. Cl.
CPC ........... *H04W 72/042* (2013.01); *H04L 1/001* (2013.01); *H04L 1/0061* (2013.01); *H04L 1/203* (2013.01)

(58) Field of Classification Search
CPC .... H04W 72/042; H04L 1/001; H04L 1/0061; H04L 1/203; H04L 1/0025; H04L 1/0041; H04L 1/0045; H04L 5/0053
(Continued)

(56) References Cited

U.S. PATENT DOCUMENTS

2019/0349242 A1\* 11/2019 Zhang .................. H04L 5/0064
2020/0236732 A1   7/2020 Liu et al.
(Continued)

FOREIGN PATENT DOCUMENTS

WO    2018/143346 A1    9/2018

OTHER PUBLICATIONS

Summary of 7.2.2 Study of necessity of a new DCI format; 3GPP TSG RAN WG1 meeting #92bis; Huawei, R1-1805630; Apr. 2018 (Year: 2018).\*
(Continued)

*Primary Examiner* — Hirdepal Singh
(74) *Attorney, Agent, or Firm* — Seed IP Law Group LLP

(57) ABSTRACT

Provided is a terminal capable of appropriately disposing a reference signal. In the terminal (200), a reception unit (201) receives a downlink signal, a DCI reception unit (203) monitors, in the downlink signal, a candidate position of a control channel, and detects control information addressed to the terminal. The number of times the candidate position of a first control channel is monitored is less than the number of times the candidate position of a second control channel is monitored.

8 Claims, 9 Drawing Sheets

| SCS | Maximum number of monitored PDCCH candidates per slot and per serving cell |
|---|---|
| 15kHz | 44 |
| 30kHz | 36 |
| 60kHz | 22 |
| 120kHz | 20 |

(58) Field of Classification Search
USPC .......................................................... 455/450
See application file for complete search history.

(56) References Cited

U.S. PATENT DOCUMENTS

| | | | |
|---|---|---|---|
| 2021/0250917 A1* | 8/2021 | Takeda | H04L 5/0053 |
| 2021/0289521 A1* | 9/2021 | Lee | H04W 72/005 |
| 2021/0385826 A1* | 12/2021 | Moon | H04W 72/04 |

OTHER PUBLICATIONS

Remaining details of Slot format indication; 3GPP TSG WG1 meeting AH 1801; Catt Potevio; R1-1800250; Jan. 2018 (Year: 2018).*
Catt, Potevio, "Remaining details of slot format indication," R1-1800250, Agenda Item: 7.3.1.3, 3GPP TSG RAN WG1 Meeting AH 1801, Vancouver, Canada, Jan. 22-26, 2018, 5 pages.
Huawei, HiSilicon, "Offline discussion summary of 7.2.6.1 Layer 1 enhancements," R1-1809951, Agenda Item 7 6.1, 3GPP TSG RAN WG1 Meeting #94, Gothenburg, Sweden, Aug. 20-24, 2018, 3 pages.
Huawei, HiSilicon, "Summary of 7.2.2 Study of necessity of a new DCI format," R1-1805630, Agenda Item: 7.2.2, 3GPP TSG RAN WG1 Meeting #92bis, Sanya, China, Apr. 16-20, 2018, 24 pages.
International Search Report, dated Aug. 27, 2019, for corresponding International Application No. PCT/JP2019/02793 8, 4 pages.
LG Electronics, "Discussion on differentiation of eMBB and URLLC services," R1-1808534, Agenda Item: 7.2.6.4, 3GPP TSG RAN WG1 Meeting #94, Gothenburg, Sweden, Aug. 20-24, 2018, 2 pages.
LG Electronics, "Discussion on layer 1 enhancements," R1-1808531, Agenda Item: 7.2.6.1, 3GPP TSG RAN WG1 Meeting #94, Gothenburg, Sweden, Aug. 20-24, 2018, 10 pages.
LG Electronics, "Discussion on polar code for control channel," R1-1700523, Agenda Item: 5.1.5.2.1, 3GPP TSG RAN WG1 NR ad-hoc, Spokane, USA, Jan. 16-20, 2017, 3 pages.
NTT Docomo, "Revision of SI: Study on New Radio Access Technology," RP-161596 (revision of RP-161214), Agenda Item: 9.2.2, 3GPP TSG RAN Meeting #73, New Orleans, Sep. 19-22, 2016, 7 pages.

* cited by examiner

| SCS | Maximum number of monitored PDCCH candidates per slot and per serving cell |
|---|---|
| 15kHz | 44 |
| 30kHz | 36 |
| 60kHz | 22 |
| 120kHz | 20 |

FIG. 1

|  | C-RNTI | MCS-C-RNTI (Release 15) | URLLC-C-RNTI |
|---|---|---|---|
| CSS#1 | 5 | 5 | 0 |
| USS#2 | 20 | 20 | 0 |
| USS#3 | 12 | 12 | 12 |
| SUM | 37 | 37 | 12 |

FIG. 7

|  | C-RNTI | MCS-C-RNTI (Release 15) | URLLC-C-RNTI |
|---|---|---|---|
| CSS#1 | 5 | 5 | 3 |
| USS#2 | 20 | 20 | 10 |
| USS#3 | 12 | 12 | 6 |
| SUM | 37 | 37 | 19 |

FIG. 8

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on *tdd-UL-DL-ConfigurationCommon*, *tdd-UL-DL-ConfigurationCommon2*, or *tdd-UL-DL-ConfigDedicated* and, if any, on detected DCI formats | | | | | | | | | | | | | |

FIG. 9

TERMINAL AND RECEPTION METHOD

TECHNICAL FIELD

The present disclosure relates to a terminal and a reception method.

BACKGROUND ART

A communication system called the fifth generation mobile communication system (5G) has been studied. For 5G, studies have been conducted on flexibly providing functions for each use case that requires an increase in higher-speed communication traffic, an increase in the number of connected terminals, a high reliability, and/or a low latency. Typical services corresponding to such use cases include enhanced Mobile Broadband (eMBB), massive Machine Type Communications (mMTC), and Ultra Reliable and Low Latency Communications (URLLC). The 3rd Generation Partnership Project (3GPP), which is an international standards-developing organization, has been studying development of communication systems in terms of both enhancement of the LTE system and New Radio Access Technology (New RAT) (see, for example, Non-Patent Literature (hereinafter referred to as "NPL") 1).

In New RAT (or NR), a terminal (also referred to as a User Equipment (UE)) is configured with a control resource set (CORESET) as a control signal channel (e.g., Physical Downlink Control Channel (PDCCH)) region in which, for example, Downlink Control Information (DCI) is arranged. It is contemplated that the UE monitors (the monitoring is also referred to as blind decoding) a Search Space (SS) within the CORESET that includes PDCCH candidate positions, so as to detect the DCI.

CITATION LIST

Non-Patent Literature

NPL 1
RP-161596, "Revision of SI: Study on New Radio Access Technology," NTT DOCOMO, September 2016

NPL 2
R1-1809951, "Offline discussion summary of 7.2.6.1 Layer 1 enhancements," Huawei, HiSilicon, August 2018

NPL 3
R1-1700523, "Discussion on polar code for control channel," LG Electronics, January 2017

SUMMARY OF INVENTION

However, methods for detecting downlink control information have not been comprehensively studied in New RAT.

One non-limiting and exemplary embodiment facilitates providing a terminal and a reception method enabling appropriate detection of downlink control information.

A terminal according to an exemplary embodiment of the present disclosure includes: a receiver, which in operation, receives a downlink signal; and circuitry, which, in operation, monitors a candidate position of a control channel in the downlink signal to detect control information addressed to the terminal, in which the number of times the candidate position of a first control channel is monitored is less than the number of times the candidate position of a second control channel is monitored.

A terminal according to an embodiment of the present disclosure includes: a receiver, which in operation, receives indication information indicating any of a first symbol configured for a downlink, a second symbol configured for an uplink, and a third symbol available for both the downlink and the uplink; and circuitry, which, in operation, monitors a candidate position of a control channel at a symbol among a plurality of symbols which is configured as the first symbol by the indication information.

A reception method according to an exemplary embodiment of the present disclosure includes: receiving a downlink signal; and monitoring a candidate position of a control channel in the downlink signal to detect control information addressed to a terminal, in which the number of times the candidate position of a first control channel is monitored is less than the number of times the candidate position of a second control channel is monitored.

A reception method according to an exemplary embodiment of the present disclosure includes: receiving indication information indicating any of a first symbol configured for a downlink, a second symbol configured for an uplink, and a third symbol available for both the downlink and the uplink; and monitoring a candidate position of a control channel at a symbol among a plurality of symbols which is configured as the first symbol by the indication information.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to appropriately detect downlink control information.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates an exemplary relation between an SCS and the maximum number of times PDCCH candidates are monitored;

FIG. 7 illustrates an exemplary number of times PDCCH candidates are monitored according to operation example 1-1 of Embodiment 1;

FIG. 8 illustrates an exemplary number of times PDCCH candidates are monitored according to operation example 1-2 of Embodiment 1; and FIG. 9 illustrates an example of an SFI.

DESCRIPTION OF EMBODIMENTS

Hereinafter, embodiments of the present disclosure will be described in detail with reference to the accompanying drawings.

URLLC requires ultra reliability and low latency. For example, when a terminal erroneously receives a control signal (in the case of false detection), it is probable that the terminal erroneously transmits/receives a data signal. Therefore, URLLC requires not the reduction of the error rate of the data signal alone but the reduction of the error rates of both the control signal (e.g., PDCCH) and the data signal.

For example, Release-15 NR targets an error rate of 1E-5 for the reliability of URLLC. Meanwhile, in scenarios such as, for example, power distribution systems or factory automation in Release 16 or later, a lower error rate (e.g., 1E-6) that is lower than the error rate (e.g., 1E-5) being the target error rate for Release-15 URLLC is also targeted (for example, see NPL 2). In order to achieve the error rate of 1E-6, it is desirable that the control signal as well as the data signal satisfy 1E-6.

In addition, the terminal monitors a plurality of PDCCH candidate positions (e.g., search space) in a PDCCH region (e.g., CORESET) to detect a control signal addressed to the terminal (the monitoring is also referred to as blind decoding).

In NR, the number of times the terminal monitors PDCCH candidate positions per slot (in other words, the number of monitored PDCCH candidates) is specified as values equal to or less than the values (maximum values) indicated in FIG. 1, for example. As illustrated in FIG. 1, with increasing subcarrier spacing (SCS) (e.g., expressed in $\mu$), the slot length decreases and, accordingly, the number of times the PDCCH candidate positions are monitored per slot decreases.

In addition, a bit called Cyclic Redundancy Check (CRC) is added to the PDCCH (e.g., DCI). Further, the CRC is multiplied by (or masked with) the value of Radio Network Temporary Identifier (RNTI) that is an identifier assigned to a control signal. The terminal determines, based on the RNTI value and the result (OK or NG) of the CRC, whether or not the control signal is addressed to the terminal.

However, the CRC may erroneously be OK even at a PDCCH candidate position where the control signal addressed to the terminal is not transmitted, and the terminal may erroneously determine (false detection) to have received the control signal addressed to the terminal. When the sequence length (number of bits) of the CRC is long, the probability of false detection in the terminal is reduced, but the throughput undesirably degrades or the processing amount undesirably increases.

An exemplary embodiment of the present disclosure will be described in relation to a method of reducing the probability of false detection in a terminal without increasing the sequence length of CRC.

Embodiment 1

[Overview of Communication System]

A communication system according to the present embodiment includes base station 100 and terminal 200.

Figure 2:
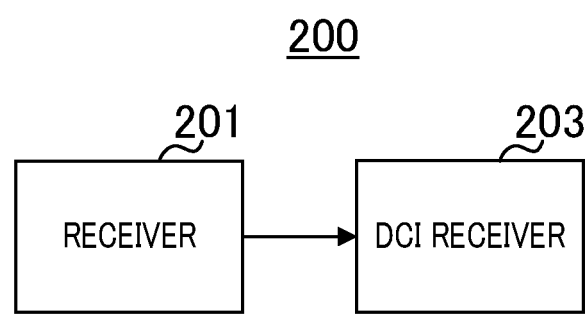
FIG. 2 is a block diagram illustrating an exemplary configuration of a part of a terminal according to Embodiment 1.

FIG. 2 is a block diagram illustrating an exemplary configuration of a part of terminal 200 according to the present embodiment. In terminal 200 illustrated in FIG. 2, receiver 201 receives a downlink signal. DCI receiver 203 monitors candidate positions (e.g., search space) of a control channel (e.g., PDCCH) in the downlink signal to detect control information (e.g., DCI) addressed to terminal 200. At this time, the number of times a first control channel (e.g., PDCCH corresponding to URLLC) is monitored is smaller than the number of times a second control channel (e.g., PDCCH corresponding to a use case other than URLLC) is monitored.

[Configuration of Base Station]

Figure 3:
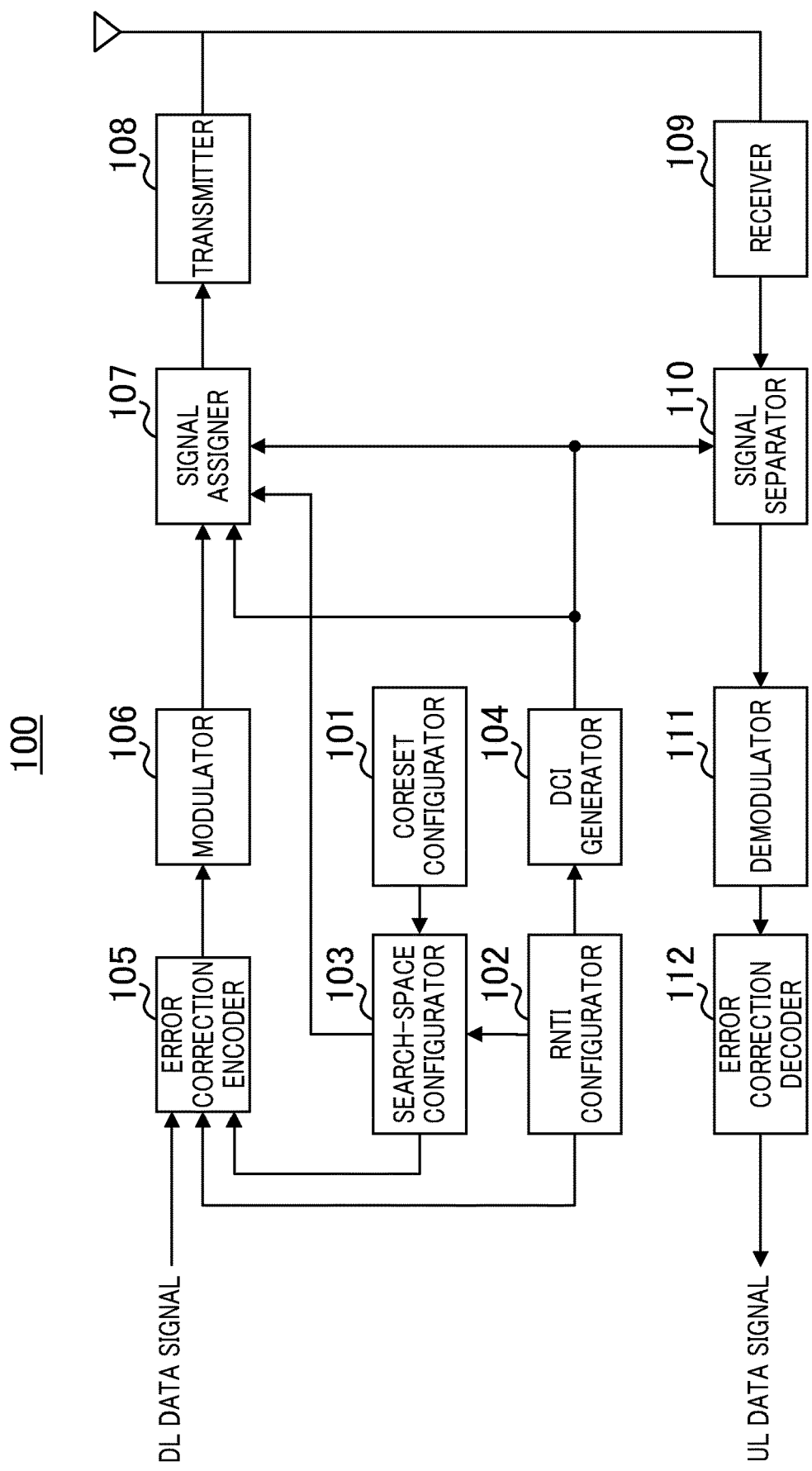
FIG. 3 is a block diagram illustrating an exemplary configuration of a base station according to Embodiment 1.

FIG. 3 is a block diagram illustrating an exemplary configuration of base station 100 according to the present embodiment. In FIG. 3, base station 100 includes CORESET configurator 101, RNTI configurator 102, search-space configurator 103, DCI generator 104, error correction encoder 105, modulator 106, signal assigner 107, transmitter 108, receiver 109, signal separator 110, demodulator 111, and error correction decoder 112.

CORESET configurator 101 determines a parameter relevant to a CORESET configured for terminal 200. Configuration of the CORESET includes the position of a resource (e.g., Physical Resource Block (PRB)) of the CORESET, the number of symbols, the presence or absence of interleaving, or precoding, for example. CORESET configurator 101 outputs CORESET configuration information indicating the determined parameter relevant to the CORESET to search-space configurator 103.

RNTI configurator 102 configures an RNTI used by terminal 200 for monitoring PDCCH candidate positions in a search space. RNTI configurator 102 outputs RNTI configuration information indicating the configured RNTI to search-space configurator 103 and DCI generator 104. RNTI configurator 102 outputs the RNTI configuration information also to error correction encoder 105 as higher layer signaling (or also referred to as a higher layer parameter or Radio Resource Control (RRC) parameter).

For example, RNTI configurator 102 distinguishes the type of data handled by terminal 200 based on information (not illustrated) from a higher layer, and configures the RNTI corresponding to the distinguished data type. For example, RNTI configurator 102 configures a "Cell-RNTI (C-RNTI)" for transmission and reception of normal data, configures a "Configured Scheduling RNTI (CS-RNTI)" for the data of Configured Scheduling, and configures a "Modulation and Coding Scheme-C-RNTI (MCS-C-RNTI)" for Release-15 URLLC. In addition, RNTI configurator 102 configures a new RNTI for data requiring still higher reliability than for Release-15 URLLC (such a new RNTI is hereinafter referred to as "URLLC-C-RNTI," for example). Note that the relation between the data types and the configured RNTIs is not limited to the above.

Search-space configurator 103 configures a search space for terminal 200. Search-space configurator 103 outputs the CORESET configuration information and search-space configuration information indicating the configured search space to error correction encoder 105 as the higher layer signaling. Search-space configurator 103 also outputs the CORESET configuration information and the search-space configuration information to signal assigner 107 in order to indicate the position where DCI is mapped.

For example, search-space configurator 103 associates a search space ID of each search space with a CORESET ID of the CORESET indicated in the CORESET configuration information inputted from CORESET configurator 101. Further, search-space configurator 103 configures, for example, the number of times the search space is monitored for each Aggregation level that represents the number of resources to which the DCI is mapped (e.g., the number of Control Channel Elements (CCEs)), the types of the search space (e.g., either a Common Search Space (CSS) or a UE specific Search Space (USS)), the slot interval at which the search space is arranged, the symbol position, and the like.

When, based on the RNTI configuration information inputted from RNTI configurator 102, terminal 200 is configured to monitor the search space using the "URLLC-C-RNTI," search-space configurator 103 configures monitoring using the URLLC-C-RNTI in the CORESET corresponding to the configured search space. The search space (CSS or USS) configured for terminal 200 is configured also as to whether or not terminal 200 performs monitoring using each of the other RNTIs than the URLLC-C-RNTI.

DCI generator 104 generates DCI that is a control signal indicating allocation of downlink data (DL data) or uplink data (UL data) (e.g., DL allocation or UL allocation). DCI generator 104 outputs, to signal assigner 107, the DCI as transmission data that includes DL allocation information indicating the DL allocation or UL allocation information indicating the UL allocation. Note that some bits (e.g., lower 16 bits) of a CRC bit string added to the DCI are masked with the RNTI corresponding to the data type based on the RNTI configuration information inputted from RNTI configurator 102. Further, DCI generator 104 outputs the DL allocation information to signal assigner 107, or outputs the UL allocation information to signal separator 110.

A transmission data signal (DL data signal) and the higher layer signaling that is inputted from RNTI configurator 102 or search-space configurator 103 are inputted to error correction encoder 105, and the error correction encoder performs error correction coding on the input signal, and outputs the encoded signal to modulator 106.

Modulator 106 performs modulation processing on the signal inputted from error correction encoder 105, and outputs the modulated data signal to signal assigner 107.

Signal assigner 107 allocates, to a resource, the data signal (for example, the DL data signal or the higher layer signaling) inputted from modulator 106 or the DCI inputted from DCI generator 104. For example, signal assigner 107 determines a resource for allocation of the DCI in accordance with the CORESET information and the search-space configuration information inputted from search-space configurator 103, and maps the DCI to the determined resource. When the DCI (e.g., CRC) is masked with the URLLC-C-RNTI, signal assigner 107 arranges the DCI in the USS that is indicated in the search-space configuration information and for which the URLLC-C-RNTI is configured. Signal assigner 107 also maps the DL data signal based on the DL allocation information inputted from DCI generator 104. The formed transmission signal is outputted to transmitter 108.

Transmitter 108 performs radio transmission processing such as upconversion on the signal inputted from signal assigner 107, and transmits the signal to terminal 200 via an antenna.

Receiver 109 receives a signal transmitted from terminal 200 via the antenna, performs radio reception processing such as downconversion on the signal, and outputs the signal to signal separator 110.

Signal separator 110 separates, based on the UL allocation information inputted from DCI generator 104, the signal inputted from receiver 109. Signal separator 110 outputs the separated signal to demodulator 111.

Demodulator 111 performs demodulation processing on the signal inputted from signal separator 110, and outputs the obtained signal to error correction decoder 112.

Error correction decoder 112 decodes the signal inputted from demodulator 111 and obtains the reception data signal (UL data signal) from terminal 200.

[Configuration of Terminal]

Figure 4:
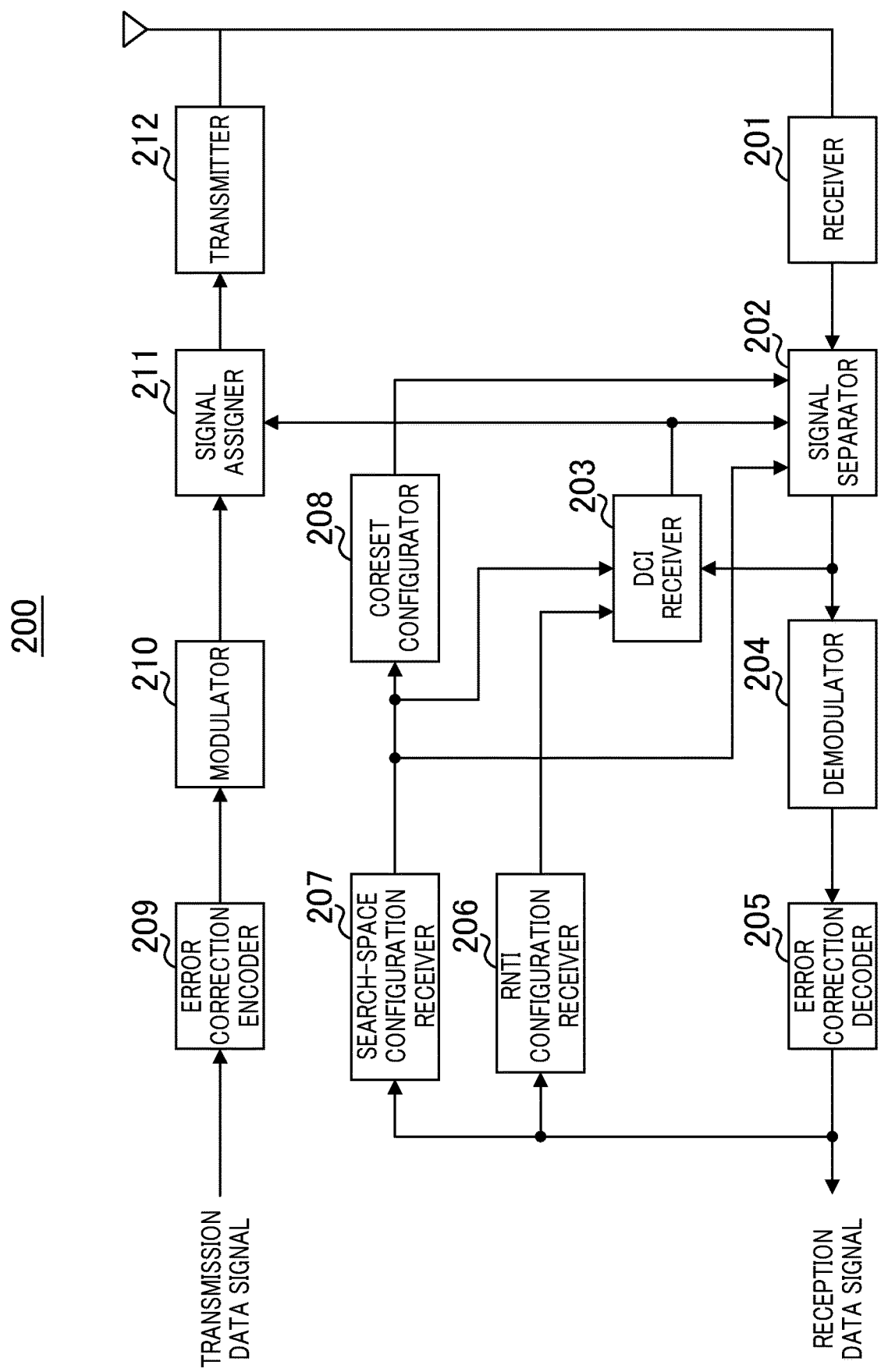
FIG. 4 is a block diagram illustrating an exemplary configuration of the terminal according to Embodiment 1.

FIG. 4 is a block diagram illustrating an exemplary configuration of terminal 200 according to the present embodiment. In FIG. 4, terminal 200 includes receiver 201, signal separator 202, DCI receiver 203, demodulator 204, error correction decoder 205, RNTI configuration receiver 206, search-space configuration receiver 207, CORESET configurator 208, error correction encoder 209, modulator 210, signal assigner 211, and transmitter 212.

Receiver 201 receives a reception signal via an antenna, and outputs the reception signal to signal separator 202 after performing reception processing such as downconversion on the reception signal.

Based on search-space configuration information inputted from search-space configuration receiver 207 and CORESET configuration information inputted from CORESET configurator 208, signal separator 202 identifies a search space within a CORESET in which separation is to be performed. Signal separator 202 separates signal components corresponding to the identified search space from the signal inputted from receiver 201 and outputs the signal components to DCI receiver 203. Further, signal separator 202 separates the DL data signal from the signal inputted from receiver 201 based on the DL allocation information inputted from DCI receiver 203, and outputs the DL data signal to demodulator 204. In addition, signal separator 202 separates the higher layer signaling from the signal inputted from receiver 201 and outputs the higher layer signaling to demodulator 204.

DCI receiver 203 configures the RNTI that is masking the DCI (e.g., CRC) based on the RNTI configuration information inputted from RNTI configuration receiver 206. DCI receiver 203 monitors, using the configured RNTI, the signal components (e.g., components corresponding to PDCCH candidate positions) inputted from signal separator 202 (the monitoring may also be referred to as blind decoding).

In addition, with respect to the CORESET corresponding to the search space configured to be monitored using the URLLC-C-RNTI, DCI receiver 203 monitors the PDCCH candidate positions using the URLLC-C-RNTI based on the search-space configuration information inputted from search-space configuration receiver 207.

DCI receiver 203 decodes and receives the DCI detected by monitoring. DCI receiver 203 outputs the DL allocation information in the decoded DCI to signal separator 202, and outputs the UL allocation information in the decoded DCI to signal assigner 211.

Demodulator 204 performs demodulation processing on the signal inputted from signal separator 202 and outputs the obtained demodulation signal to error correction decoder 205.

Error correction decoder 205 decodes the demodulation signal inputted from demodulator 204, outputs the obtained higher layer signaling to RNTI configuration receiver 206 and search-space configuration receiver 207, and outputs the obtained reception data signal.

RNTI configuration receiver 206 receives the RNTI configuration information included in the higher layer signaling inputted from error correction decoder 205, and obtains the configuration of the RNTI to be used by terminal 200 to monitor the PDCCH candidate positions in the search space. RNTI configuration receiver 206 outputs, to DCI receiver 203, the RNTI configuration information indicating the configuration of the RNTI to be used for monitoring the PDCCH candidate positions.

Search-space configuration receiver 207 receives the search-space configuration information included in the higher layer signaling inputted from error correction decoder 205, and obtains configurations such as, for example, the search space ID, the number of times the search space is monitored for each Aggregation level, the type of the search space (CSS or US S), the slot interval at which the search space is arranged, the symbol position, and the like. Search-space configuration receiver 207 outputs the search-space configuration information indicating the obtained configurations to signal separator 202.

In addition, search-space configuration receiver 207 receives the CORESET configuration information included in the higher layer signaling, and outputs the CORESET configuration information to CORESET configurator 208.

When the search space corresponding to the CORESET to be monitored using the URLLC-C-RNTI is configured for terminal 200, search-space configuration receiver 207 outputs, to DCI receiver 203, information indicating the search space (e.g., search space ID) corresponding to the CORESET to be monitored using the URLLC-C-RNTI.

Based on the CORESET configuration information inputted from search-space configuration receiver 207, CORESET configurator 208 outputs, to signal separator 202, the CORESET configuration information indicating parameters relevant to the CORESET configured for terminal 200 (e.g., configurations on the position of a PRB, the number of symbols, the presence or absence of interleaving, precoding, and the like).

A transmission data signal (UL data signal) is inputted to error correction encoder 209, and the error correction encoder performs error correction coding on the transmission data signal and outputs the encoded signal to modulator 210.

Modulator 210 modulates the signal inputted from error correction encoder 209 and outputs the modulated signal to signal assigner 211.

Signal assigner 211 identifies the resource for allocation of the UL data signal based on the information inputted from DCI receiver 203 (e.g., UL allocation information), allocates the signal inputted from modulator 210 (e.g., UL data signal) to the identified resource, and outputs the signal to transmitter 212.

Transmitter 212 performs radio transmission processing such as upconversion on the signal inputted from signal assigner 211, and transmits the signal.

[Operation of Base Station 100 and Terminal 200]

Next, the operation of base station 100 (see FIG. 3) and terminal 200 (see FIG. 4) will be described in detail.

Figure 5:
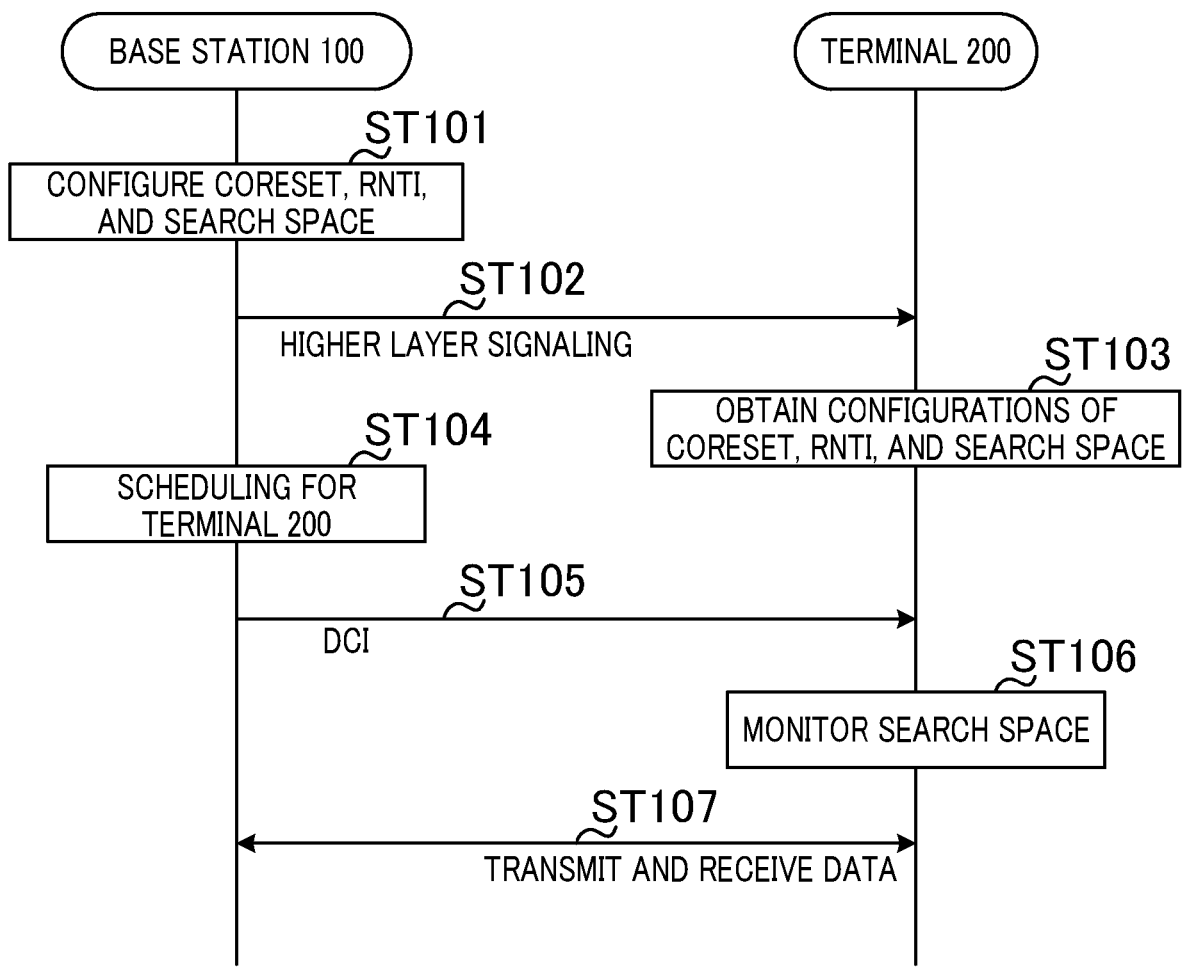
FIG. 5 is a sequence diagram illustrating an operation example of the base station and the terminal according to Embodiment 1.

FIG. 5 is a sequence diagram illustrating exemplary processing of base station 100 and terminal 200.

In FIG. 5, base station 100 configures terminal 200 with a CORESET, an RNTI, and a search space (ST101). Base station 100 notifies terminal 200 of higher layer signaling indicating configurations of the CORESET, RNTI, and search space (ST102). Terminal 200 obtains the configurations of the CORESET, RNTI, and search space from the higher layer signaling indicated from base station 100 (ST103).

Base station 100 performs scheduling for terminal 200 (ST104), and generates DCI including a scheduling result (e.g., DL allocation information or UL allocation information). Note that, the DCI is masked with, for example, the RNTI corresponding to the type of data scheduled for terminal 200.

Base station 100 transmits the generated DCI to terminal 200 using, for example, the CORESET corresponding to the search space configured at ST101 (ST105).

Terminal 200 monitors the CORESET corresponding to the search space based on the configurations obtained at ST103, and detects a PDCCH (or DCI) addressed to terminal 200 (ST106). Note that, the details of a method for terminal 200 to monitor the search space will be described later.

Base station 100 and terminal 200 transmit and receive data (DL data or UL data) based on contents indicated by the DCI (ST107).

Next, the method for terminal 200 to monitor the search space (PDCCH candidate positions) will be described in detail.

For example, in NR, a plurality of search spaces for CSS and USS are configured as follows:

Type 0/0A CSS: System Information-RNTI (SI-RNTI);
Type 1 CSS: Random Access-RNTI (RA-RNTI), Temporary C-RNTI (TC-RNTI);
Type 2 CSS: Paging RNTI (P-RNTI);
Type 3 CSS: Interruption RNTI (INT-RNTI), Slot Format Indication RNTI (SFI-RNTI), Transmit Power Control-PUSCH-RNTI (TPC-PUSCH-RNTI), TPC-Physical Uplink Control Channel-RNTI (TPC-PUCCH-RNTI), TPC-Sounding Reference Symbols-RNTI (TPC-SRS-RNTI), C-RNTI, MCS-C-RNTI, CS-RNTI; and
USS: C-RNTI, MCS-C-RNTI, CS-RNTI.

Specifically, there are multiple types of CSSes depending on applications (in other words, depending on data types). A UE detects, in a CSS, a PDCCH (DCI) masked with an RNTI that differs from application to application.

Meanwhile, it is specified that, in the USS, the UE monitors any CORESET for the USS configured for the UE using an RNTI (e.g., C-RNTI, MCS-C-RNTI, or CS-RNTI) that is configured for the UE to be monitored, and further monitors even a Type 3 CSS. This is to improve the flexibility of scheduling of data signals.

For example, in Release 15, the MCS-C-RNTI can be used as an RNTI for URLLC. When the UE is configured to monitor the MCS-C-RNTI, the UE monitors the PDCCH with the MCS-C-RNTI in addition to the C-RNTI and CS-RNTI (if configured) in the USS. Further, when the UE detects the PDCCH masked with the MCS-C-RNTI, the MCS (combination of a modulation scheme and a coding method) used for the data is changed to the MCS for URLLC.

Note that the number of times the PDCCH of same size is monitored using a plurality of different RNTIs is counted as once. Thus, the processing amount required for the UE to monitor the USS and Type 3 CSS using a plurality of RNTIs does not significantly increase.

As described above, there is a case where the CRC is erroneously OK even for a PDCCH candidate position at which the control signal addressed to the UE is not transmitted, and accordingly, the UE erroneously determines (false detection) to have received the control signal addressed to the UE.

By way of example, the CRC added to each control signal (e.g., PDCCH) is 24 bits long. Here, in the 24-bit CRC, considering that an L=8 SC list decoder is applied to a polar code that is an error correction code for the control signal, for example, it is expected that a false detection probability (e.g., False Alarm Rate (FAR)) will be approximately $(½)^{(21)}$=4.7E-7 (see, for example, NPL 3). Accordingly, the more PDCCH candidate positions the UE monitors, the higher the false detection probability. For example, the false detection probability exceeds 1E-6 required in Release 16 or later (in other words, the error rate lower than the error rate required in Release-15 URLLC).

Therefore, in the present embodiment, terminal 200 is configured with a smaller number of times the candidate positions of a PDCCH for allocation of data requiring ultra reliability (e.g., PDCCH for URLLC) are monitored that is smaller than the number of times the candidate positions of a PDCCH for use cases other than URLLC are monitored. Limiting the number of times the PDCCH requiring ultra reliability is monitored can reduce the probability of false detection of the PDCCH requiring ultra reliability.

Hereinbelow, descriptions will be given of operation examples 1-1, 1-2, and 1-3 of base station 100 and terminal 200 in the present embodiment.

Operation Example 1-1

In operation example 1-1, a new RNTI is assigned to a PDCCH for allocation of data requiring ultra reliability. In other words, an RNTI used for masking the PDCCH for allocation of the data requiring the ultra reliability is different from an RNTI used for masking other PDCCHs.

Here, the new RNTI is referred to as "URLLC-C-RNTI" by way of example.

Further, in operation example 1-1, a search space in which the PDCCH to be monitored by terminal 200 using the URLLC-C-RNTI is arranged is limited. For example, the region in which terminal 200 monitors the PDCCH using the URLLC-C-RNTI is limited to a partial region of a CORESET corresponding to a search space configured for terminal 200.

When configuring terminal 200 with the search space, base station 100 designates the search space (or CORESET) to be monitored by terminal 200 using the URLLC-C-RNTI.

For example, base station 100 configures a search space ID when configuring the search space. Base station 100 configures which CORESET (CORESET ID) the search space corresponding to the configured search space ID is arranged, the chronological monitoring periodicity, Aggregation level for monitoring, the search space type (CSS or USS), and the like.

In addition to configuring the search space as described above, base station 100 determines whether or not terminal 200 monitors the search space using the "URLLC-C-RNTI."

Note that, in operation example 1-1, terminal 200 can use the URLLC-C-RNTI in combination with the MCS-C-RNTI. When terminal 200 is configured to monitor the search space using the MCS-C-RNTI, search spaces of CSS PDCCH type 3 and every USS are monitored, for example.

Further, in operation example 1-1, terminal 200 is not configured with the CS-RNTI. However, terminal 200 may be configured with the CS-RNTI.

Figure 6:
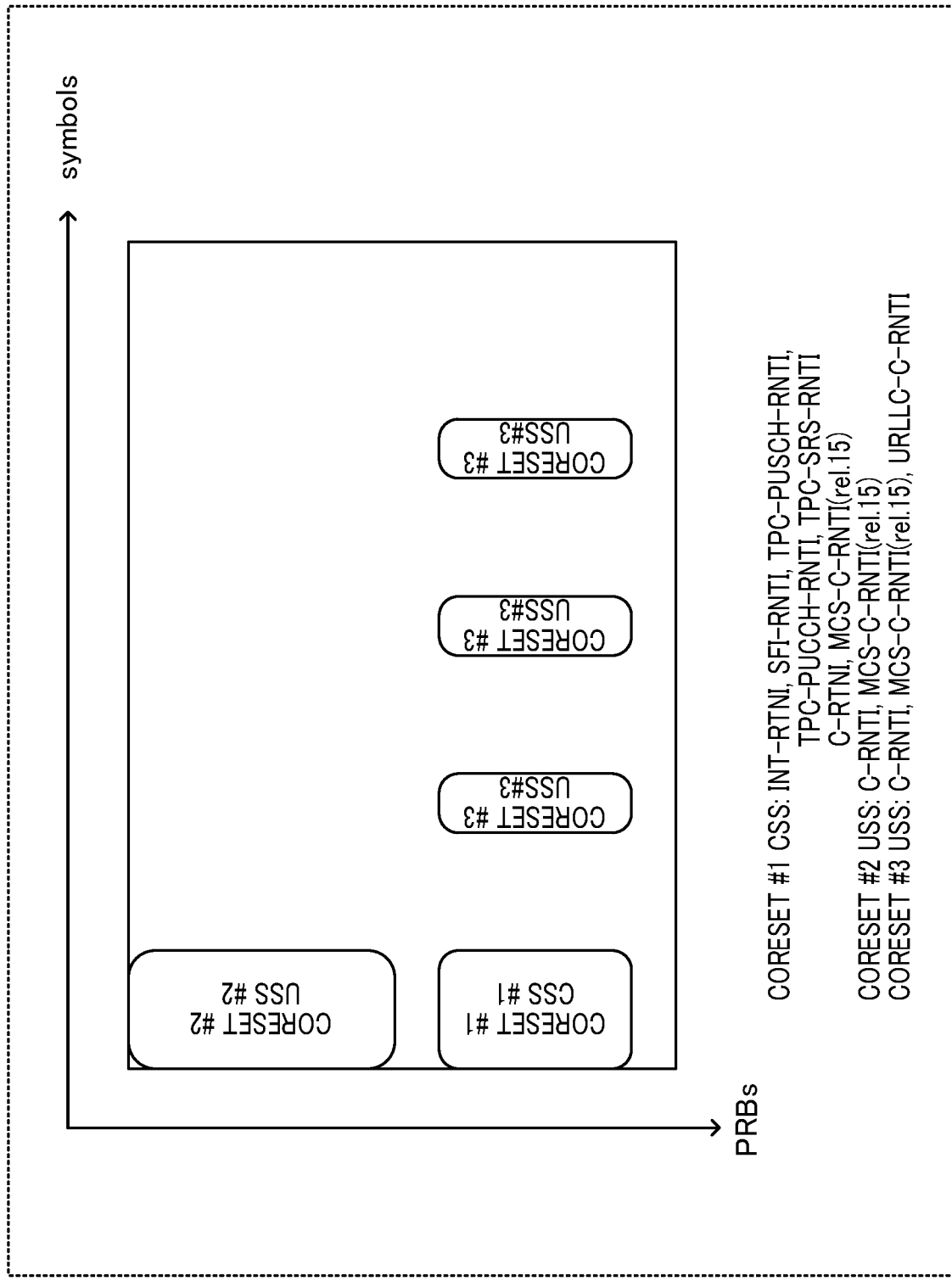
FIG. 6 illustrates a configuration example of search spaces.

FIG. 6 illustrates a configuration example of the search spaces within one slot.

In FIG. 6, search space ID #1, which is a Type 3 PDCCH CSS, is configured as CORESET #1. Further, in FIG. 6, search space ID #2, which is a USS, is configured as CORESET #2, and search spaces ID #3 are configured respectively as CORESETs #3.

In search space ID #1 (CSS #1) and search space ID #2 (USS #2), terminal 200 monitors the CORESETs at one timing per slot. Further, in search spaces ID #3 (USS #3), terminal 200 monitors the CORESETs at respective three timings per slot.

In FIG. 6, terminal 200 is configured to monitor the PDCCH using the new RNTI "URLLC-C-RNTI" in search spaces ID #3 that are the USSes.

In this case, in CORESET #1 that is search space ID #1 (Type 3 PDCCH CSS), terminal 200 monitors the PDCCH using an RNTI (e.g., INT-RNTI, SFI-RNTI, TPC-PUSCH-RNTI, TPC-PUCCH-RNTI, TPC-SRS-RNTI, or C-RNTI, MCS-C-RNTI (rel. 15)) which is defined in advance to be monitored in the Type 3 PDCCH CSS.

In addition, in CORESET #2 that is search space ID #2 (USS), terminal 200 monitors the PDCCH using an RNTI (C-RNTI or MCS-C-RNTI (rel. 15) which is defined in advance to be monitored in the USS.

Further, in CORESETs #3 that are search spaces ID #3 (USSes configured to be monitored using the URLLC-C-RNTI), terminal 200 monitors the PDCCH using the URLLC-C-RNTI in addition to the RNTI (C-RNTI or MCS-C-RNTI (rel. 15) defined in advance to be monitored in the USS.

By way of example, FIG. 7 illustrates the number of times the PDCCH is monitored per slot using each of the C-RNTI, MCS-C-RNTI (rel. 15), and URLLC-C-RNTI.

Hereinafter, by way of example, the number of times the PDCCH is monitored in search space ID #1 (CSS #1) is configured to "5," the number of times the PDCCH is monitored in search space ID #2 (USS #2) is configured to "20," and the number of times the PDCCH is monitored in search space ID #3 (USS #3) is configured to "12" that is the sum of the number of times at the three timings.

As illustrated in FIG. 6, the C-RNTI and MCS-C-RNTI (rel. 15) are defined in all of CSS #1 (CORESET #1), USS #2 (CORESET #2), and USS #3 (CORESET #3). Accordingly, as illustrated in FIG. 7, the number of times the PDCCH is monitored per slot using the C-RNTI and the number of times the PDCCH is monitored per slot using the MCS-C-RNTI (rel. 15) are 37 times each that is the sum of the number of monitoring times (5 times, 20 times, and 12 times) configured for the search spaces (CSS #1, USS #2, and USS #3).

Meanwhile, as illustrated in FIG. 6, the URLLC-C-RNTI is defined in USS #3 (CORESET #3) but is not defined in the other search spaces. Thus, as illustrated in FIG. 7, the number of times the PDCCH is monitored per slot using the URLLC-C-RNTI is 12 times that is the number of monitoring times configured for USS #3.

As is understood, in operation example 1-1, the search space monitored by terminal 200 using the URLLC-C-RNTI is limited to a part of the search spaces (USS #3 in FIG. 6). In other words, the channel region monitored for the PDCCH corresponding to the URLLC-C-RNTI is smaller than the channel region monitored for the PDCCH corresponding to the other RNTIs. By limiting the search space IDs and CORESET IDs monitored using the URLLC-C-RNTI, the number of times the search space is monitored using the URLLC-C-RNTI is made smaller than the number of times the search space is monitored using another RNTI as illustrated in FIG. 7. In other words, it is possible to reduce the number of times terminal 200 monitors the PDCCH corresponding to the URLLC-C-RNTI, and thus to reduce the false detection rate of the PDCCH which corresponds to the URLLC-C-RNTI and requires ultra reliability.

In addition, regarding the C-RNTI and MCS-C-RNTI (rel. 15), terminal 200 monitors the PDCCH in all the search spaces (e.g., all of the USSes and Type 3 CSS) and, therefore, resource allocation flexibility can be maintained.

For example, base station 100 may assign the URLLC-C-RNTI to URLLC requiring an error rate lower than Release-15 URLLC such that the MCS-C-RNTI and URLLC-C-RNTI may be used selectively or in combination according to desired error rate characteristics.

Note that operation example 1-1 has been described in which the PDCCH is monitored using the C-RNTI and MCS-C-RNTI in all the USSes as illustrated in FIG. 7. However, regarding the C-RNTI, MCS-C-RNTI, or CS- RNTI, the search spaces may also be configured individually as to whether or not the PDCCH is to be monitored. This limits the PDCCH monitored by terminal 200 for another RNTI different than the URLLC-C-RNTI, so as to allow a decrease in the false detection rate of PDCCH corresponding to the RNTI.

Operation Example 1-2

Operation example 1-2 differs from operation example 1-1 in that terminal 200 monitors, also for the URLLC-C-RNTI, the PDCCH in the regions (e.g., the Type 3 CSS and USS) the same as the regions monitored for the other RNTIs.

However, the number of times the search spaces are monitored using the URLLC-C-RNTI (in other words, the number of times the PDCCH is monitored) is configured to a value smaller than the number of times the search spaces are monitored using another RNTI (for example, C-RNTI or the like).

For example, base station 100 notifies terminal 200 of the number of times the search spaces are monitored using the URLLC-C-RNTI.

The number of times the PDCCH is monitored using the URLLC-C-RNTI may be represented by, for example, a ratio (or a difference) based on the whole (in other words, the number of times the PDCCH is monitored using the other RNTIs), or may be represented by a numerical value.

Alternatively, the upper limit value of the number of times the PDCCH is monitored using the URLLC-C-RNTI may be determined. When the number of times the PDCCH is monitored using the URLLC-C-RNTI indicated to terminal 200 is greater than the upper limit value, terminal 200 limits the number of times the PDCCH is monitored using the URLLC-C-RNTI to the upper limit value.

FIG. 8 illustrates, as an example of operation example 1-2, the number of times the PDCCH is monitored per slot using each of the C-RNTI, MCS-C-RNTI (rel. 15) and URLLC-C-RNTI.

In FIG. 8, the number of times the PDCCH is monitored using the URLLC-C-RNTI is half of the number of times the PDCCH is monitored using the C-RNTI (or MCS-C-RNTI).

For example, after terminal 200 obtains the number of times the PDCCH is monitored for the C-RNTI, the terminal sets, to half of the obtained number of monitoring times, the number of times the PDCCH is monitored for the URLLC-C-RNTI. Note that, FIG. 8 illustrates an example in which, when the number of times the PDCCH is monitored for the C-RNTI is indivisible, the value of the number of monitoring times is rounded up; however, the present disclosure is not limited to this example and the value may be truncated.

As is understood, in operation example 1-2, the channel regions (e.g., CORESETs) monitored for the PDCCH using the URLLC-C-RNTI are the same as the channel regions monitored for the PDCCH using the RNTIs other than the URLLC-C-RNTI. However, in operation example 1-2, the number of times the PDCCH is monitored using the URLLC-C-RNTI is configured smaller than the number of times the PDCCH is monitored using another RNTI in each of the CORESETs configured for terminal 200.

It is thus possible for terminal 200 to reduce the number of monitoring times for terminal 200 without limiting the CORESETs corresponding to the search spaces where the PDCCH is to be monitored using the URLLC-C-RNTI, and to reduce the false detection rate of the PDCCH that corresponds to the URLLC-C-RNTI and requires ultra reliability.

Note that, in each of the search spaces configured for terminal 200, the PDCCH candidate positions monitored by terminal 200 using the URLLC-C-RNTI may be determined, for example, in ascending order of PDCCH candidate numbers in the search space, in descending order of the PDCCH candidate numbers in the search space, by odd numbers of the PDCCH candidate numbers, by even numbers of the PDCCH candidate numbers, or the like.

Note also that, CCE Aggregation levels for the PDCCH candidate positions monitored by terminal 200 using the URLLC-C-RNTI may be limited. For example, terminal 200 may preferentially monitor a higher one of the Aggregation levels determined for monitoring of the PDCCH. Preferential monitoring of a higher Aggregation level makes it possible for base station 100 to transmit DCI for URLLC to terminal 200 at a higher Aggregation level. Accordingly, preferential monitoring of a higher Aggregation level makes it possible to improve the error rate characteristics as compared to the error rate characteristics in a case where the DCI is transmitted at a lower Aggregation level.

In addition, base station 100 may separately indicate, to terminal 200, which Aggregation level is to be assumed for monitoring the PDCCH candidate positions for URLLC. For example, DCI may be used for the indication. A conceivable example of the DCI used for the indication is a group-common DCI. The group-common DCI can include an indication of an Aggregation level addressed to a plurality of terminals. Terminal 200 extracts, from the received group-common DCI, a bit including the indication addressed to terminal 200, and sets the Aggregation level for the PDCCH candidate positions for URLLC for terminal 200.

Operation Example 1-3

In operation example 1-3, unlike in operation examples 1-1 and 1-2, even when the error rate of 1E-6 is targeted, the "MCS-C-RNTI" corresponding to URLLC is used and the number of times the PDCCH is monitored using the MCS-C-RNTI is limited.

For example, base station 100 indicates, to terminal 200, whether the MCS-C-RNTI is used for monitoring the PDCCH in the Type 3 CSS and all the USSes, whether the MCS-C-RNTI is used for monitoring the PDCCH in a particular limited USS as in the case of "URLLC-C-RNTI" in operation example 1-1, or whether the MCS-C-RNTI is used for monitoring the PDCCH a limited number of times in the search spaces as in the case of "URLLC-C-RNTI" in operation example 1-2.

Further, when base station 100 configures terminal 200 to monitor the PDCCH using the MCS-C-RNTI, the base station may indicate whether the PDCCH is monitored in the Type 3 CSS and all the USSes or whether the USSes monitored for the PDCCH are limited. In addition, as in operation example 1-2, the number of times the PDCCH is monitored using the MCS-C-RNTI in the search spaces may be limited without limiting the search spaces monitored for the PDCCH using the MCS-C-RNTI.

Operation examples 1-1, 1-2, and 1-3 have been described above.

Note that operation example 1-1 and operation example 1-2 may, for example, be combined with each other. For example, the search spaces monitored using the URLLC-C-RNTI may be limited to a part of the search spaces configured for terminal 200 as in operation example 1-1, and the number of times the PDCCH is monitored using the URLLC-C-RNTI in the part of the search spaces may be configured smaller than the number of times the PDCCH is monitored using the other RNTIs as in operation example 1-2.

In the present embodiment, when terminal 200 monitors the PDCCH candidate positions in the search spaces to detect the DCI addressed to terminal 200, the number of times the PDCCH requiring higher reliability is monitored is configured smaller than the number of times another PDCCH is monitored.

Thus, the false detection rate is reduced correspondingly to the reduction of the number of times the PDCCH requiring higher reliability is monitored. It is thus possible to reduce the probability of false detection in terminal 200 without increasing the sequence length of CRC. Therefore, the present embodiment makes it possible for terminal 200 to detect the PDCCH (DCI) appropriately, and it is thus possible, for example, to achieve a reduction in the error rate of both the control signal and the data signal.

Note that, when the number of times the PDCCH (e.g., PDCCH for URLLC) requiring higher reliability is monitored is reduced to a number of times smaller than the number of times another type of PDCCH is monitored, the resource region to which the PDCCH for URLLC can be allocated is reduced to a smaller resource region. However, it is conceivable that a higher priority is placed on URLLC because URLLC requires higher reliability and lower latency than other use cases. Accordingly, the PDCCH for URLLC is more likely to be preferentially allocated to resources than PDCCHs for other use cases. Therefore, even when the resource region to which the PDCCH for URLLC can be allocated is small, its effect on the allocation of PDCCH for URLLC is small.

Further, the CS-RNTI defines a bit string, besides the CRC, that is known to a UE. Depending on whether or not the known bit string has been received correctly, the UE is capable of detecting whether or not the DCI has been received correctly. It is conceivable to insert the known bit string into DCI for URLLC. The longer the known bit string, the lower the probability of false detection. Thus, the number of times the PDCCH is monitored using the RNTI for URLLC may be increased with increasing length of the known bit string, while the number of times the PDCCH is monitored using the RNTI for URLLC may be reduced with decreasing length of the known bit string. It is thus possible to configure, according to the false detection rate, the number of times the PDCCH is monitored using the RNTI for URLLC.

In addition, the search spaces monitored for URLLC may be limited to a search space monitored multiple times within one slot. URLLC also requires reduction of delay time. The reason for this limitation is that multiple times of monitoring within one slot allows reduction of the amount of delay.

Embodiment 2

A base station and a terminal according to Embodiment 2 respectively have the same basic configurations as base station 100 and terminal 200 according to Embodiment 1, and will thus be described with reference to FIGS. 3 and 4.

In NR, a Slot Format Indicator (SFI) is introduced. The SFI is indicated, for example, using Radio Resource Control (RRC), which is higher layer signaling, or DCI format 2_0, which is physical layer signaling. Further, the SFI indicates that symbols in a slot are each a symbol configured for DL ("D"; referred to as "DL symbol"), a symbol configured for UL ("U"; referred to as "UL symbol"), or a flexible symbol ("F") as illustrated in FIG. 9, for example.

The flexible symbol can be used as both the DL and UL symbols. The flexible symbol can also be used as a symbol to which no resource is allocated (which may also be referred to as "blank symbol" or "Unknown symbol," for example).

In NR, the UL symbol ("U") or DL symbol ("D") can be designated using the SFI of DCI format 2_0 for each symbol configured in the SFI of the RRC as the flexible symbol.

Note that, NR defines that a UE does not monitor a PDCCH candidate position at the symbol configured as the flexible symbol in the SFI of the RRC and configured as the flexible symbol in the SFI of DCI format 2_0.

Meanwhile, when a symbol is configured as the flexible symbol in the SFI of the RRC and there is no configuration for the symbol in the SFI of DCI format 2_0, the UE can monitor the PDCCH candidate position even at the symbol. However, when another DCI designates, for the symbol, the location of a PUSCH, PUCCH, RACH, or SRS and it is indicated that the symbol is to be used as the UL symbol, the UE uses the symbol as the UL symbol and does not monitor the PDCCH candidate position.

Here, for example, when the flexible symbol is configured by the SFI of the RRC and the configuration by the SFI of DCI format 2_0 is absent, and when the UE detects another DCI indicating that a UL transmission is performed at the flexible symbol, the UE does not monitor the PDCCH candidate position at the flexible symbol.

However, when the other DCI indicating the UL transmission that has been detected by the UE is of false detection, and actually, the base station had transmitted DCI at the PDCCH candidate position at the flexible symbol, the UE cannot detect the DCI because the UE does not monitor the PDCCH candidate position at the symbol. If the UE fails DCI detection, the UE cannot transmit or receive data. In particular, in scenarios targeting an error rate of 1E-6 (e.g., use cases requiring ultra reliability), there is a possibility that false detection of the DCI makes it impossible to achieve the desired error rate. Further, there is a problem that retransmission takes place due to the false detection, resulting in an increase in the amount of delay.

To address this issue, in the present embodiment, terminal 200 monitors, at the symbols configured as DL, PDCCH candidate positions of a PDCCH masked with the RNTI for URLLC requiring a low error rate. In other words, terminal 200 does not monitor the PDCCH candidate positions of the PDCCH masked with the RNTI for URLLC at the symbols configured for the uses other than DL (e.g., UL symbol or flexible symbol).

With this configuration, terminal 200 does not monitor the PDCCH candidate positions at the flexible symbols. It is thus possible to avoid inability of terminal 200 to receive the PDCCH that is caused when the terminal erroneously detects the other DCI to erroneously recognize the flexible symbol as the UL symbol.

Hereinbelow, descriptions will be given of operation examples 2-1 and 2-2 of base station 100 and terminal 200 in the present embodiment.

Operation Example 2-1

In operation example 2-1, when terminal 200 monitors the PDCCH using an RNTI for URLLC requiring a low error rate, the SFI of the RRC is used in combination with the SFI of DCI format 2_0 in order to prevent terminal 200 from misrecognizing the flexible symbol as the UL symbol due to the false detection of the DCI.

For example, for a slot configured such that the PDCCH is monitored using the new RNTI "URLLC-C-RNTI" as in operation example 1-1 or operation example 1-2 of Embodiment 1, base station 100 notifies terminal 200 of the SFI of DCI format 2_0.

Terminal 200 monitors a PDCCH candidate position using the URLLC-C-RNTI at a symbol indicated by the SFI of the RRC as the flexible symbol, when the symbol is indicated as the DL symbol by the SFI of DCI format 2_0. In other words, terminal 200 does not monitor the PDCCH candidate position using the URLLC-C-RNTI at the symbol indicated by the SFI of the RRC as the flexible symbol, when the symbol is not indicated as DL symbol "D" by the SFI of DCI format 2_0.

Thus, even when, with respect to the symbol indicated as the DL symbol by the SFI of DCI format 2_0, terminal 200 is configured by another DCI with a transmission of UL data, an uplink control signal (Uplink Control Information (UCI)), or a reference signal, the terminal can recognize that the other DCI is erroneously detected. It is thus possible for terminal 200 to stop the UL transmission and monitor the PDCCH candidate position for the DCI actually transmitted by base station 100.

Accordingly, it is possible to reduce the probability of detection errors in detection of PDCCH candidate positions due to false detection of DCI, and to reduce the effect on false detection in URLLC. Therefore, operation example 2-1 can reduce the probability of false detection even without limiting the number of PDCCH candidates for data requiring resource allocation flexibility, such as data allocated according to DCI masked with a C-RNTI.

Operation Example 2-2

In operation example 2-2, when an SFI of RRC is configured while an SFI of DCI format 2_0 is not configured in a case where terminal 200 monitors an RNTI for URLLC requiring a low error rate, the terminal does not monitor the RNTI for URLLC at a symbol indicated as the flexible symbol in the SFI of the RRC.

For example, when terminal 200 is indicated to monitor a PDCCH using a new RNTI "URLLC-C-RNTI" as in operation example 1-1 or operation example 1-2 of Embodiment 1, the terminal does not monitor a PDCCH candidate position using the URLLC-C-RNTI at a symbol indicated as the flexible symbol in the SFI of the RRC but monitors the PDCCH candidate position using another RNTI (e.g., C-RNTI, CS-RNTI or MCS-C-RNTI (rel. 15), or the like).

With this configuration, the PDCCH (DCI) masked with the URLLC-C-RNTI is not transmitted at the flexible symbol. Therefore, even if terminal 200 misrecognizes the flexible symbol as the UL symbol, URLLC allocation is not affected.

Further, since the DCI masked with the URLLC-C-RNTI is not transmitted at the flexible symbol while the DCI masked with the other RNTI is transmitted even at the flexible symbol, it is possible to maintain the resource allocation flexibility for DCI corresponding to data for which a desired error rate is not as low as 1E-6.

Operation examples 2-1 and 2-2 have been described above.

As is understood, in the present embodiment, terminal 200 monitors a PDCCH requiring higher reliability at a symbol among a plurality of symbols in a slot which is configured as the DL symbol by the SFI.

For example, terminal 200 monitors the PDCCH requiring higher reliability at a symbol configured as the DL symbol by the SFI of DCI format 2_0 among symbols configured as the flexible symbol by the SFI of the RRC. In other words, base station 100 assigns a PDCCH (or DCI) requiring higher reliability to the symbol configured as the DL symbol by the SFI of DCI format 2_0 among the symbols configured as the flexible symbol by the SFI of the RRC.

As is understood, limitation on symbols to which the PDCCH requiring higher reliability is allocated (in other words, target symbols for monitoring) allows terminal 200 to detect, with certainty, the PDCCH requiring higher reliability, thereby reducing the false detection rate. It is thus possible to reduce the probability of false detection in terminal 200 without increasing the sequence length of CRC.

Therefore, the present embodiment makes it possible for terminal 200 to detect the PDCCH (DCI) appropriately, and it is thus possible to achieve a reduction, for example, in the error rate of both the control signal and the data signal.

Note that, although operation example 2-1 and operation example 2-2 have been described on the assumption that the new RNTI "URLLC-C-RNTI" is used as in operation example 1-1 and operation example 1-2 of Embodiment 1, operation example 2-1 and operation example 2-2 are also applicable to the case where "MCS-C-RNTI" is used as in operation example 1-3 of Embodiment 1. In this case, in operation example 2-1, the SFI of DCI format 2_0 is transmitted for the slot in which terminal 200 monitors the MCS-C-RNTI. In addition, in operation example 2-2, terminal 200 does not monitor the PDCCH candidate positions using the MCS-C-RNTI at the flexible symbols indicated by the SFI of the RRC.

The embodiments of the present disclosure have been described above.

Other Embodiments

Note that although the above embodiments assume RRC signaling for the higher layer signaling, the RRC signaling may be replaced with an indication via MAC signaling and DCI that is physical layer signaling. The MAC signaling and physical layer signaling allow a more frequent changeover than the RRC signaling.

In addition, the name "URLLC-C-RNTI" is merely an example, and the above exemplary embodiments can be applied to an RNTI with a different name.

In addition, in the above embodiments, URLLC is used as an example of the data type (or application) requiring higher reliability, but the data type requiring higher reliability is not limited to URLLC. The above embodiments are applicable to RNTIs for applications other than URLLC when it is desirable that the number of times the PDCCH candidate positions are monitored be changed (reduced) so as to be different from the number of monitoring times of another RNTI such as C-RNTI or the like.

In addition, the present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal of an exemplary embodiment of the present disclosure includes: a receiver, which in operation, receives a downlink signal; and circuitry, which, in operation, monitors a candidate position of a control channel in the downlink signal to detect control information addressed to the terminal, in which the number of times the candidate position of a first control channel is monitored is less than the number of times the candidate position of a second control channel is monitored.

In the terminal of an exemplary embodiment of the present disclosure, a channel region monitored for the first control channel is smaller than a channel region monitored for the second control channel.

In the terminal in an exemplary embodiment of the present disclosure, a channel region monitored for the first control channel is the same as a channel region monitored for the second control channel, and, in each of the channel regions, the number of times the candidate position of the first control channel is monitored is less than the number of times the candidate position of the second control channel is monitored.

In the terminal of an exemplary embodiment of the present disclosure, an identifier used for masking the first control channel is different from an identifier used for masking the second control channel.

A terminal of an exemplary embodiment of the present disclosure includes: a receiver, which in operation, receives indication information indicating any of a first symbol configured for a downlink, a second symbol configured for an uplink, and a third symbol available for both the downlink and the uplink; and circuitry, which, in operation, monitors a candidate position of a control channel at a symbol among a plurality of symbols which is configured as the first symbol by the indication information.

In the terminal of an exemplary embodiment of the present disclosure, the indication information is indicated by a physical layer.

In a terminal of an exemplary embodiment of the present disclosure, the receiver receives first indication information indicated by a higher layer and second indication information indicated by a physical layer, and the circuitry monitors the candidate position of the control channel at a symbol configured as the third symbol by the first indication information and configured as the first symbol by the second indication information, and does not monitor the candidate position of the control channel when the symbol is configured as the third symbol by the first indication information and the second indication information is absent.

A reception method of an exemplary embodiment of the present disclosure includes: receiving a downlink signal; and monitoring a candidate position of a control channel in the downlink signal to detect control information addressed to a terminal, in which the number of times the candidate position of a first control channel is monitored is less than the number of times the candidate position of a second control channel is monitored.

A reception method of an exemplary embodiment of the present disclosure includes: receiving indication information indicating any of a first symbol configured for a downlink, a second symbol configured for an uplink, and a third symbol available for both the downlink and the uplink; and monitoring a candidate position of a control channel at a symbol among a plurality of symbols which is configured as the first symbol by the indication information.

The disclosure of Japanese Patent Application No. 2018-181867 dated Sep. 27, 2018 including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101, 208 CORESET configurator
102 RNTI configurator
103 Search-space configurator
104 DCI generator
105, 209 Error correction encoder
106, 210 Modulator
107, 211 Signal assigner
108, 212 Transmitter 109, 201 Receiver
110, 202 Signal separator
111, 204 Demodulator
112, 205 Error correction decoder
200 Terminal
203 DCI receiver
206 RNTI configuration receiver
207 Search-space configuration receiver

The invention claimed is:

1. A terminal, comprising:
a receiver, which in operation, receives a downlink signal; and
circuitry, which, in operation, monitors a candidate position of a control channel in the downlink signal to detect control information addressed to the terminal, wherein
a first number of times the candidate position of a first control channel is monitored is less than a second number of times the candidate position of a second control channel is monitored,
the first number of times is a total number of monitoring times for at least one search space in which the first control channel is configured among a plurality of search spaces in a slot, and
the second number of times is a total number of monitoring times for at least one search space in which the second control channel is configured among the plurality of search spaces.

2. The terminal according to claim 1, wherein
a channel region monitored for the first control channel is smaller than a channel region monitored for the second control channel.

3. The terminal according to claim 1, wherein
a channel region monitored for the first control channel is the same as a channel region monitored for the second control channel, and,
in each of the channel regions, the first number of times the candidate position of the first control channel is monitored is less than the second number of times the candidate position of the second control channel is monitored.

4. The terminal according to claim 1, wherein
an identifier used for masking the first control channel is different from an identifier used for masking the second control channel.

5. A terminal, comprising:
a receiver, which in operation, receives indication information indicating at least one symbol selected from: a first symbol configured for a downlink, a second symbol configured for an uplink, and a third symbol available for both the downlink and the uplink; and
circuitry, which, in operation, monitors a candidate position of a control channel at a symbol among a plurality of symbols which is configured as the first symbol by the indication information, the control channel being an ultra reliability and low latency communication (URLLC) channel, wherein
the receiver, in operation, receives first indication information indicated by a higher layer and second indication information indicated by a physical layer, and
the circuitry, in operation
monitors the candidate position of the control channel at a symbol configured as the third symbol by the first indication information and configured as the first symbol by the second indication information, and
does not monitor the candidate position of the control channel in response to the symbol being configured as the third symbol by the first indication information and the second indication information being absent.

6. The terminal according to claim 5, wherein
the indication information is indicated by the physical layer.

7. A reception method, comprising:
receiving a downlink signal; and
monitoring a candidate position of a control channel in the downlink signal to detect control information addressed to a terminal, wherein
a first number of times the candidate position of a first control channel is monitored is less than a second number of times the candidate position of a second control channel is monitored,
the first number of times is a total number of monitoring times for at least one search space in which the first control channel is configured among a plurality of search spaces in a slot, and
the second number of times is a total number of monitoring times for at least one search space in which the second control channel is configured among the plurality of search spaces.

8. A reception method, comprising:
receiving indication information indicating at least one symbol selected from: a first symbol configured for a downlink, a second symbol configured for an uplink, and a third symbol available for both the downlink and the uplink; and
monitoring a candidate position of a control channel at a symbol among a plurality of symbols which is configured as the first symbol by the indication information, the control channel being an ultra reliability and low latency communication (URLLC) channel, wherein
receiving the indication information includes receiving first indication information indicated by a higher layer and second indication information indicated by a physical layer, and
monitoring the candidate position includes:
monitoring the candidate position of the control channel at a symbol configured as the third symbol by the first indication information and configured as the first symbol by the second indication information, and
refraining from monitoring the candidate position of the control channel in response to the symbol being configured as the third symbol by the first indication information and the second indication information being absent.

* * * * *